US010150416B2

(12) United States Patent
Masckauchan

(10) Patent No.: US 10,150,416 B2
(45) Date of Patent: Dec. 11, 2018

(54) AUTOMOBILE OR VEHICLE PROXIMITY SENSOR AND WARNING DISPLAY MOUNTED ON OUTSIDE REAR VIEW MIRROR

(71) Applicant: Alexilex 770, LLC, Hollywood, FL (US)

(72) Inventor: Alejandro Masckauchan, Hollywood, FL (US)

(73) Assignee: Alexilex 770, LLC, Hollywood, FL (US)

( * ) Notice: Subject to any disclaimer, the term of this patent is extended or adjusted under 35 U.S.C. 154(b) by 0 days.

(21) Appl. No.: 15/601,342

(22) Filed: May 22, 2017

(65) Prior Publication Data
US 2018/0272947 A1    Sep. 27, 2018

Related U.S. Application Data

(60) Provisional application No. 62/475,557, filed on Mar. 23, 2017.

(51) Int. Cl.
*B60R 1/08*    (2006.01)
*B60R 1/12*    (2006.01)
(Continued)

(52) U.S. Cl.
CPC .............. *B60R 1/12* (2013.01); *B60Q 1/0076* (2013.01); *B60Q 1/2665* (2013.01); *B60R 1/078* (2013.01);
(Continued)

(58) Field of Classification Search
CPC .... B60R 2300/8026; B60R 2001/1223; B60R 2001/1284
(Continued)

(56) References Cited

U.S. PATENT DOCUMENTS 5,463,384 A    10/1995 Juds
6,193,380 B1    2/2001 Jacobs
(Continued)

FOREIGN PATENT DOCUMENTS

CN    203864566    8/2014

OTHER PUBLICATIONS

"Blind Spot Sensor System." See Rear View Safety, rearviewsafety. com, RVSBES20, 20150902. hipp://web.archive.org/web/20150902235839/www.rearviewsafety.com/blindspotsensorsyst.
(Continued)

*Primary Examiner* — Kevin Kim
(74) *Attorney, Agent, or Firm* — Robert C. Kain, Jr.

(57) ABSTRACT

The automobile proximity sensor and warning display is mounted on an outside rear view mirror of a vehicle. A flat base plate, adhered to the outside mirror, coacts with a removable body on a front side of the base. The battery powered system includes a proximity detector, responsive to approaching vehicles, generating an alarm signal sent to a lighted display. The body may have a removable mirror. The body may be coupled to the base by complementary coupling sub-systems or an insertable body portion coacting with a shelf on the base wherein a depressible tab is sized to fit within a shelf orifice. As a power saver, an accelerometer detects motion and a timeout circuit turns OFF system power when no motion is detected for a predetermined period of time.

22 Claims, 15 Drawing Sheets

(51) Int. Cl.
*B60R 1/078* (2006.01)
*B60Q 1/00* (2006.01)
*B60Q 1/26* (2006.01)
*G01S 13/93* (2006.01)
*G01S 13/04* (2006.01)

(52) U.S. Cl.
CPC .......... *B60R 2001/1215* (2013.01); *B60R 2001/1284* (2013.01); *G01S 13/04* (2013.01); *G01S 13/931* (2013.01); *G01S 2013/9332* (2013.01)

(58) Field of Classification Search
USPC .................................................. 340/903, 904
See application file for complete search history.

(56) References Cited

U.S. PATENT DOCUMENTS

| | | | |
|---|---|---|---|
| 6,363,326 | B1 | 3/2002 | Scully |
| 6,696,931 | B2 | 2/2004 | Paranjpe |
| 6,919,796 | B2 | 7/2005 | Boddy et al. |
| 6,970,074 | B2 | 11/2005 | Perlman |
| 7,190,283 | B1 | 3/2007 | Varian |
| 7,492,281 | B2 | 2/2009 | Lynam et al. |
| 7,602,276 | B2 | 10/2009 | Madau |
| 7,965,197 | B1 | 6/2011 | Engelmann |
| 8,004,425 | B2 | 8/2011 | Hoek et al. |
| 8,058,977 | B2 | 11/2011 | Lynam |
| 8,125,325 | B2 | 2/2012 | Liou |
| 8,564,425 | B2 | 10/2013 | Al-Jafar |
| 8,786,704 | B2 | 7/2014 | Foote et al. |
| 9,041,552 | B2 | 5/2015 | Yu |
| 9,056,584 | B2 | 6/2015 | Fish et al. |
| 9,102,281 | B2 | 8/2015 | Rodriguez |
| 9,153,133 | B1 | 10/2015 | Lunsford |
| 2013/0176145 | A1* | 7/2013 | Yu .......................... G08G 1/162 340/905 |
| 2016/0052451 | A1 | 2/2016 | O'Kane et al. |

OTHER PUBLICATIONS

Drive Assist, Candid®, Jan. 1, 2017 http://www.candid86.com/en/productshow.pht?cid=19&id=48.
"Blind Spot Monitor/Side Assist System with LED Indicator Detection," ADT. See autodragons.com, accessed: Jan. 1, 2017, http://www.autodragons.com/products_detail/productID.

* cited by examiner

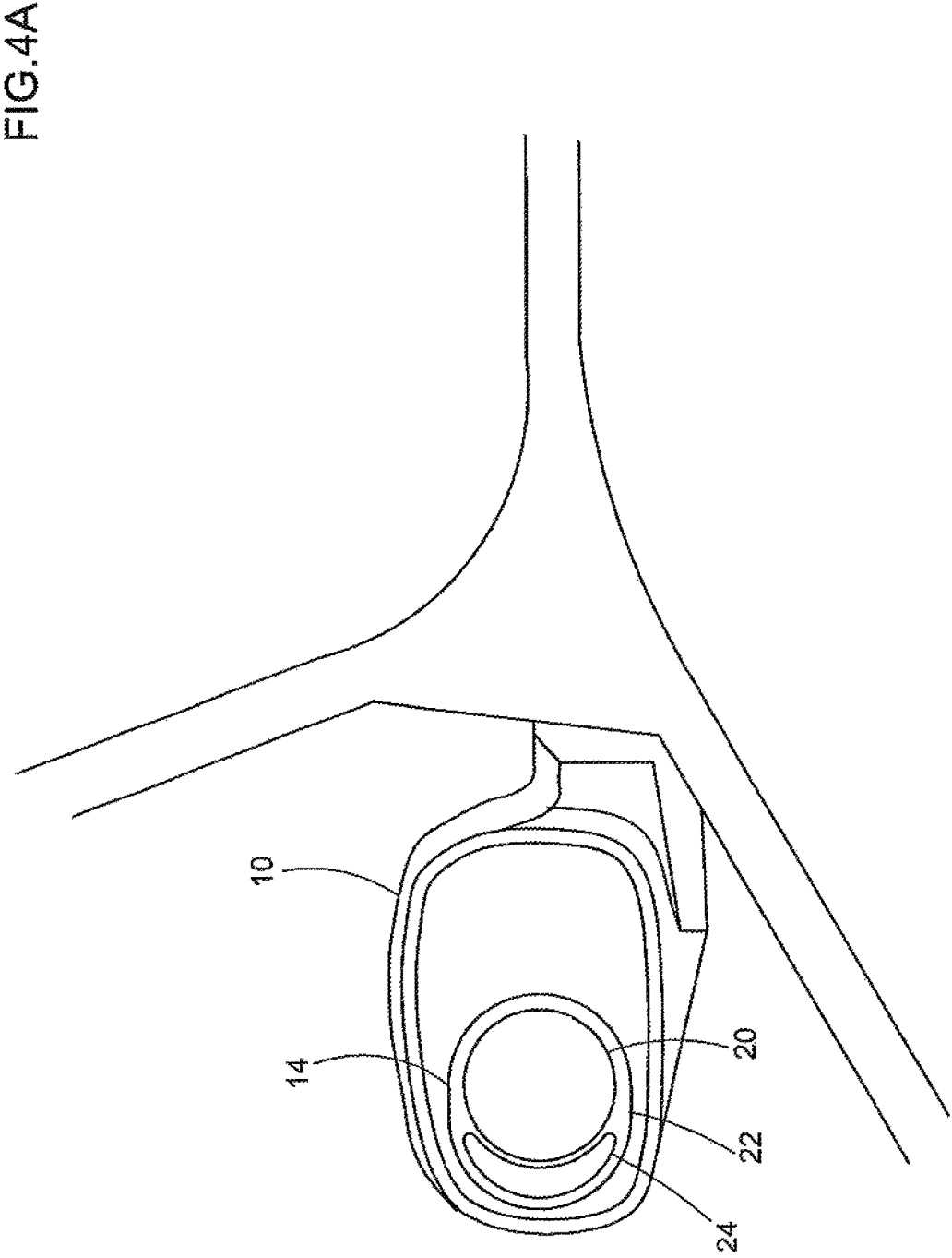

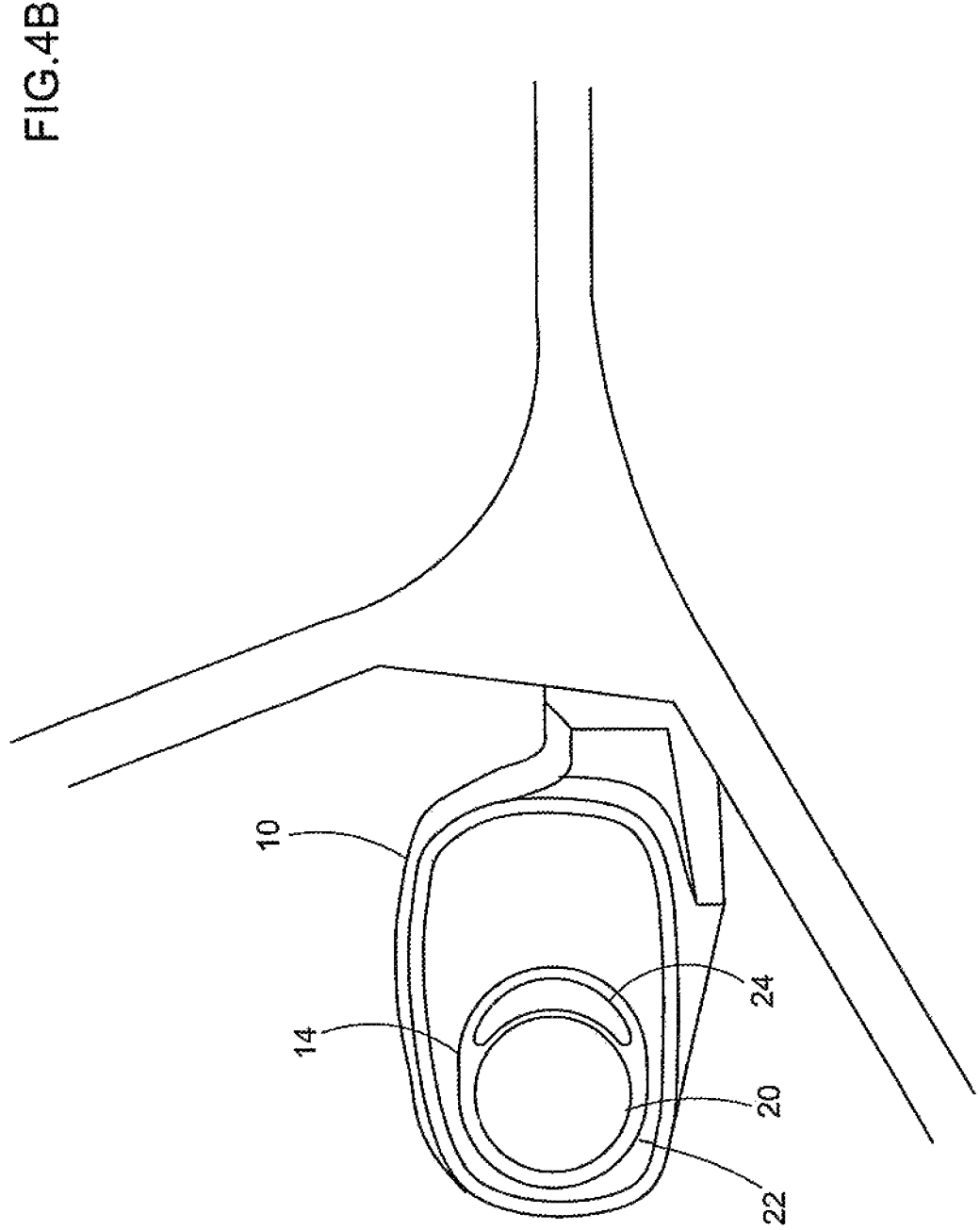

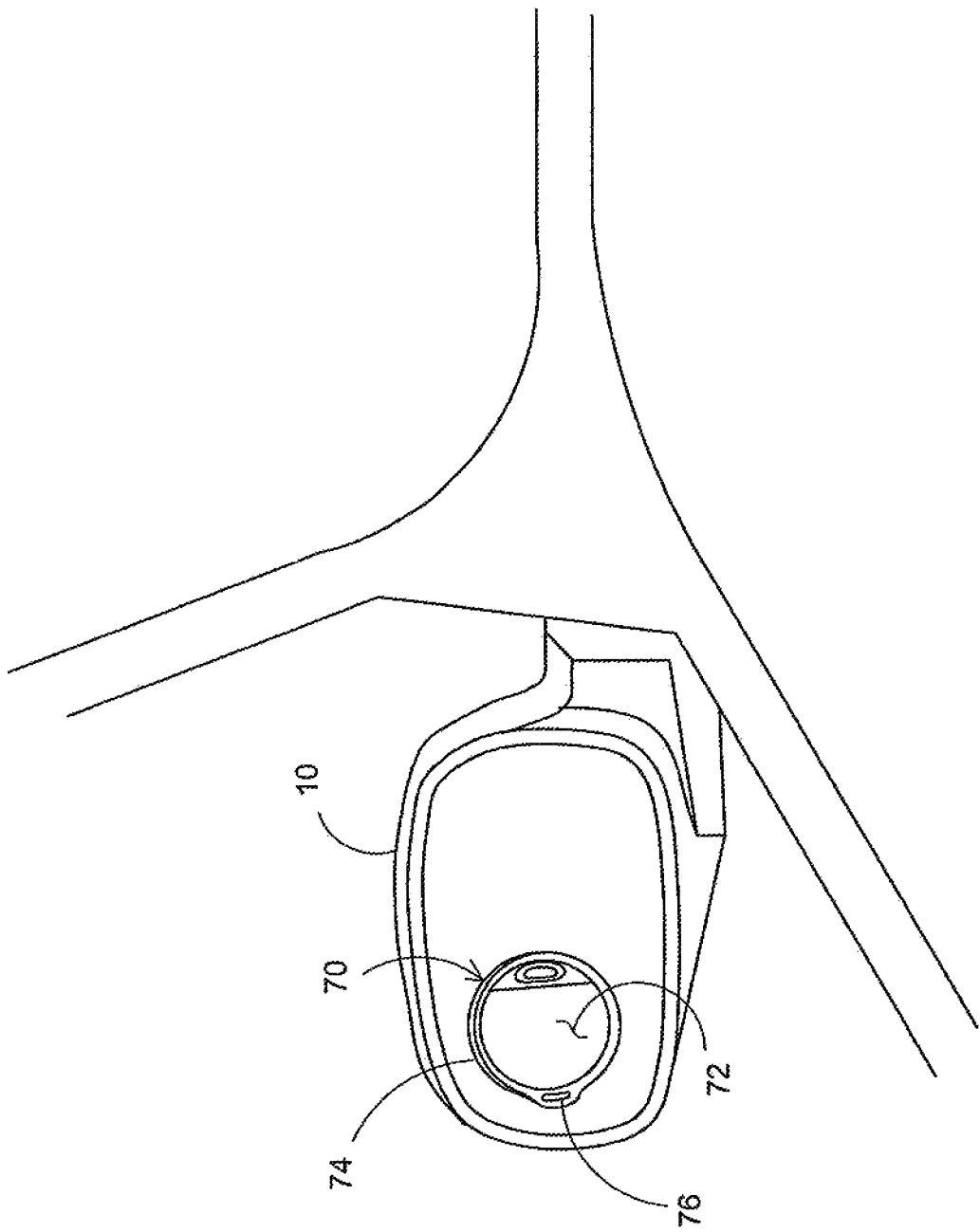

AUTOMOBILE OR VEHICLE PROXIMITY SENSOR AND WARNING DISPLAY MOUNTED ON OUTSIDE REAR VIEW MIRROR

This is a regular patent application based upon and claiming the benefit of provisional patent application filed on Mar. 23, 2017, Ser. No. 62/475,557, the contents of which is incorporated herein by reference thereto. The present invention relates to an aftermarket automobile or vehicle proximity sensor and warning display which is mounted on the outside rearview mirror or mirrors on a vehicle. The proximity sensor can be mounted on any type of vehicle seeking to add a visual warning to the driver when another vehicle approaches the driver's vehicle in the left side blind spot or the right side blind spot.

BACKGROUND OF THE INVENTION

It is well-established that drivers have blind spots when they are operating vehicles, such as trucks, vans or automobiles. These blind spots typically occur on the left side or the right side of the vehicle slightly behind the rear end of the vehicle.

U.S. Pat. No. 6,696,931 to Paranjpe discloses a retrofittable collision warning apparatus for vehicles that alerts the operator to potential obstacles in the vicinity of the vehicle during operations such as parking and driving in stop and go traffic conditions. The patent disclosure shows remote sensors which are attached by adhesive to the outside of the vehicle. The vehicle collision warning apparatus includes a solar panel for providing charging power to said battery. A base unit may be attached to the vehicle dashboard or rear view mirror, and remote units may be attached to vehicle in a variety of locations using adhesive, two-sided tape, or screws. The remote units are contained in a well sealed package to withstand harsh environmental conditions and use ultrasonic distance sensors. Distance sensors may also use a radar sensing means for measuring the distance between said vehicle and said obstacles. Visual and audio signal means are used for alerting the operator of the vehicle U.S. Pat. No. 7,965,197 to Engelmann discloses a vehicle proximity warning device for warning a driver that another vehicle is positioned in the driver's blind spots wherein a pair of heat detecting sensors is attached to a first and second rearview mirrors by an adhesive or a mechanical fastener. The heat detecting sensors may comprise any conventional type of heat detecting means such as infrared heat sensors. A light emitter is in communication with the sensor and emits light when the sensor detects heat above a threshold temperature. A pair of clips may be provided to secure the light emitters to the rear view mirrors. The light emitters may be powered by the vehicle's battery or by removable batteries held within housing of the light emitters.

U.S. Pat. No. 8,004,425 to Hoek et al discloses a vehicular blind spot detection system for alerting a driver of a motor vehicle to an object in the vehicle's blind spot using rear mounted and front facing imaging devices. The vehicular blind spot detection may use various types of sensors including infrared sensors and radar sensors. An LED array is used to notify the driver. A power source for powering the sensor, the control unit and the plurality of light sources is provided by a rechargeable battery that receives energy from a solar panel or photovoltaic module.

U.S. Pat. No. 9,041,552 to Yu discloses systems and methods for detecting automobile blind spots including at least one infrared transmitter for transmitting detection signals. The infrared transmitter is positioned at a front facing direction of the side mirror body. An alert module may include any appropriate circuitry and devices to alert the driver of any object in the blind spot of the vehicle. For example, alert module may include alert indicator for emitting an alerting light to the driver. The detection system is mounted on the outer side of side mirror body of the vehicle.

U.S. Pat. No. 8,125,325 to Liou discloses an integrated driving assistance apparatus capable of improving night visibility and providing a lane deviation alarm, a blind spot detection alarm, and a panoramic image. The integrated driving assistance apparatus includes a detector, an infrared emitter, an image sensor, and an image processor. The detector is configured to detect whether the headlight and the turn signal light are turned on or off respectively. The infrared emitter is located on the side view mirror and irradiates infrared ray when the detector detects that the headlight is turned on. The image sensor is located on the side view mirror for capturing one image of both side areas of the vehicle. The image processor is coupled to the image sensor and the detector and configured to receive and process the image to generate a warning signal. The indicator can be an organic light emitting diode (OLDE) display.

U.S. Pat. No. 9,102,281 to Rodriguez discloses a rearview mirror for a vehicle with a set of indicator lights wherein the first indicator light for indication of the spotter mirror is activated in a distinctive color in response to the activation of a blind zone object detector. The blind zone object detector is suitable for detecting an approaching vehicle. The light that automatically catches the attention of the driver toward the spotter mirror.

Other prior art systems include a "Blind Spot Sensor System," which discloses a blind spot sensor system featuring waterproof sensors mountable to the outside of a vehicle and a visual alert on the pillar. See Rear View Safety, rearviewsafety.com, RVSBES20, 20150902. A "Drive Assist," called Candid®, discloses a blind spot detection radar system featuring radar sensors, LED indicator lights, and 12 DC power supply. See candid86.com. A "Blind Spot Monitor/Side Assist System With LED Indicator Detection" has a range 3 m×8 m warning function. It is a Universal Type without mirror. See ADT™, blind spot monitor for all cars featuring an LED visual warning. See autodragons.com.

Objects of the Invention

It is an object of the present invention to provide an automobile or vehicle proximity sensor and warning display which is adapted to be mounted on an outside rearview mirror of a vehicle.

It is another object of the present invention to provide a two-piece proximity sensor and display wherein the battery is disposed in either the base or the body of the sensor—display and the two pieces are removable to provide easy access and replacement of the battery.

It is another object of the present invention to provide a proximity sensor and warning display having some type of mirrored surface, sometimes a rotating platform mirror, and at other times a removable mirror, and further the mirrored surface may have various configurations such as a convex or concave mirrored surface or a partially convex or concave mirror element on a flat mirrored surface.

It is a further object of the present invention to provide a proximity sensor and display which includes electronics which powers down the sensor and the display when the vehicle has not moved for a predetermined period of time, such as 10 minutes. In this manner, the energy in the battery is saved since the sensor does not continuously emit radar, sonar or other types of vehicle approaching detection signals while the automobile is turned OFF.

It is a further object of the present invention to provide a two-piece proximity sensor and display wherein the base has a substantially flat face, a portion of the base forms a sleeve defined by a shelf rising above the base plane and the body has an insertion section which is fitted into the sleeve opening. A depressive tab on the insertion section pops up into an opening or orifice in the shelf. To remove the body from the base, the user depresses the tab and withdraws the body.

SUMMARY OF THE INVENTION

The automobile proximity sensor and warning display is mounted on an outside rear view mirror of a vehicle. The automobile proximity sensor and display includes a substantially flat plate planar base having an adhesive layer on a rear side of the base such that the base is to be attached to the outside rear view mirror. The system includes a body removably mounted on a front side of the base. A battery is disposed in a cavity in either the base or the body. The battery can be removed from the cavity by removing the body from the base. An automobile proximity detector is disposed in the body and powered by the battery. The proximity detector is adapted to respond to an approaching vehicle and generate an alarm signal. The system also includes a light generating display, such as an LED, powered by the battery and coupled to the proximity detector, which LED light is illuminated in the presence of the alarm signal.

In one of several embodiments, the automobile proximity sensor and display body has an outboard facing mirrored surface. Sometimes, the mirror is on a rotating platform.

The system has a means for removable attachment between the body and the base. These removable attachment sub-systems include a hook and loop attachment; a magnetic attachment; a snap attachment; a tongue and groove attachment; a flat head pin and channel attachment; and a threaded attachment. These removable attachment sub-systems may be called coupler sub-systems, permitting attachment and detachment between said body and said base. Examples of couplers include hook and loop complementary couplers; a magnetic complementary couplers; a snap system; tongue and groove complementary couplers; a flat head pin coacting with a channel coupler; and threaded complementary couplers.

In one embodiment, the body has a substantially flat outboard facing surface upon which is mounted a removable mirror which can be a mirror having a substantially flat mirrored surface; a mirror having a fully convex mirrored surface; a mirror having a fully concave mirrored surface; a mirror having a convex mirrored surface formed atop a flat mirrored surface; and a mirror having a convex mirrored surface formed atop a flat mirrored surface.

The display is located in either the base or the body. A solar panel may be added on an outboard surface of either the body or the base and electrically coupled to the battery and adapted to recharge the battery.

An embodiment of the automobile proximity sensor and display includes an accelerometer powered by the battery which generates a motion signal, a timer which is coupled to the accelerometer which timer generates a time-out signal after a predetermined period of time, and a system power switch coupled to and interposed between the battery and the proximity detector. The system power switch has a control input coupled to the timer and the system power switch is turned OFF in the presence of the time-out signal.

The automobile proximity sensor and display may include a shelf rising above a portion of the substantially flat plate planar base. The shelf forms a sleeve opening between the substantially flat plate planar base and the shelf. The shelf has an orifice or opening on the top surface therein. The body has an insertion section adapted to be inserted into the sleeve opening. The body's insertion section has a depressible tab sized to fit within and extend through the shelf orifice. In this manner, the body is removably mounted onto the base by insertion of the insertion section into the sleeve opening and is locked onto the base by coaction of the depressible tab in the shelf orifice. The body is removable from the base by depression of the tab and withdrawal of the insertion section from the sleeve opening.

Sometimes the body has a substantially flat outboard facing surface beyond the insertion section and has (a) an outboard facing mirrored surface beyond the insertion section; (b) a rotating platform on the outboard facing surface, the platform having the mirrored surface is which adapted to rotate; and/or (c) a removably mounted mirror. The removable mirror is one of: a mirror having a substantially flat mirrored surface, a mirror having a fully convex mirrored surface; a mirror having a fully concave mirrored surface; a mirror having a convex mirrored surface formed atop a flat mirrored surface; and a mirror having a convex mirrored surface formed atop a flat mirrored surface.

BRIEF DESCRIPTION OF THE DRAWINGS

Further objects and advantages of the present invention can be found in the detailed description of the preferred embodiments when taken in conjunction with the accompanying drawings.

FIG. 4A diagrammatically illustrates an outside rear view mirror with the automobile proximity sensor and display.

FIG. 4B diagrammatically illustrates a different embodiment for the proximity sensor and display.

FIG. 11 diagrammatically illustrates another embodiment of the two-piece proximity sensor and warning display.

DETAILED DESCRIPTION OF THE PREFERRED EMBODIMENTS

The present invention relates to an automobile or vehicle proximity sensor and warning display system which is mounted on the outside rear view mirror of any type of vehicle such as an automobile, truck or van. The term "automobile" as used herein refers to any type of motorized vehicle. Similar numerals designate similar items throughout the drawings.

Figure 1:
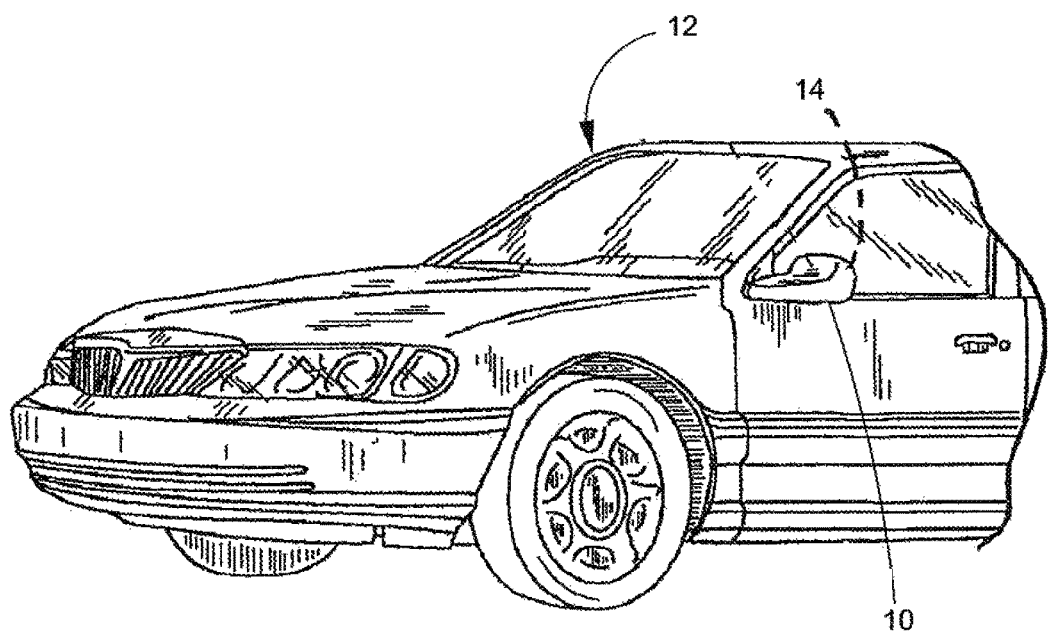
FIG. 1 diagrammatically illustrates the front portion of an automobile (it should be noted that any type of vehicle such as a truck or van may use the automobile proximity sensor and display).
Figure 2:
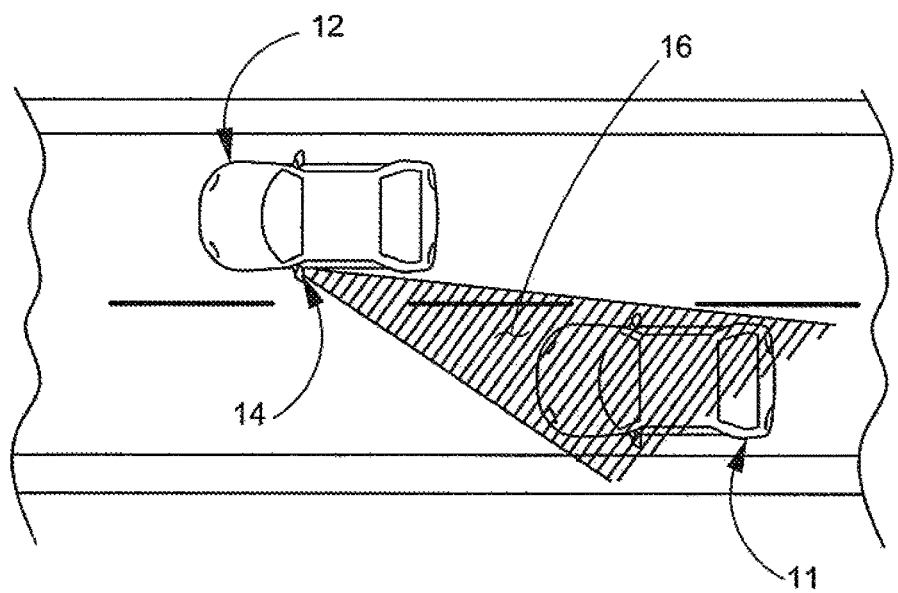
FIG. 2 and FIG. 3 diagrammatically illustrate the transmitted signal from the proximity detector and the received signal from the automobile or vehicle approaching the driver's vehicle.
Figure 3:
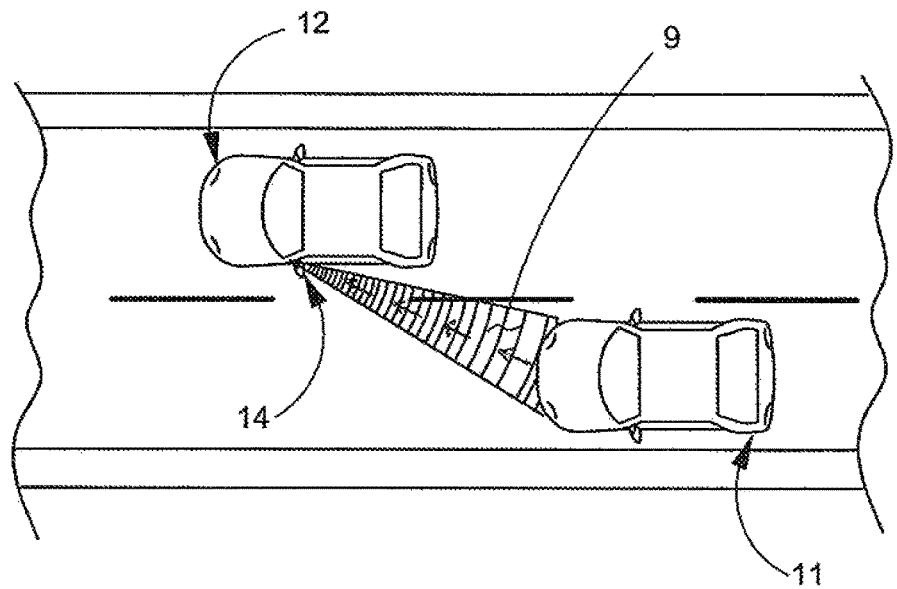

FIG. 1 diagrammatically illustrates the front end of a vehicle 12 having an outside rear view mirror 10. The proximity sensor and warning display system 14 is mounted on outside mirror 10. FIG. 2 shows vehicle 12 and the proximity sensor and display 14 emitting some type of detection signal 16 to the left side rear of vehicle 12. The proximity sensor and display 14 is operable to detect oncoming vehicle 11. FIG. 3 diagrammatically shows the return or bounce back signal 9 which returns to proximity sensor and warning unit 14 due to the presence of oncoming vehicle 11.

FIG. 4A and FIG. 4B diagram diagrammatically illustrate proximity sensor and warning display system 14 mounted on the mirror portion of outside rear view mirror 10. In one embodiment, the sensor and warning device 14 includes a mirror 20 on the generally flat outboard face of unit 14, and a sensor and display element 24 either facing away from the driver (FIG. 4A) or facing towards the driver (FIG. 4B). The outer structure 22 of sensor and display system 14 rises above the surface of the mirror defined by the outside rear view mirror system 10.

Figure 5:
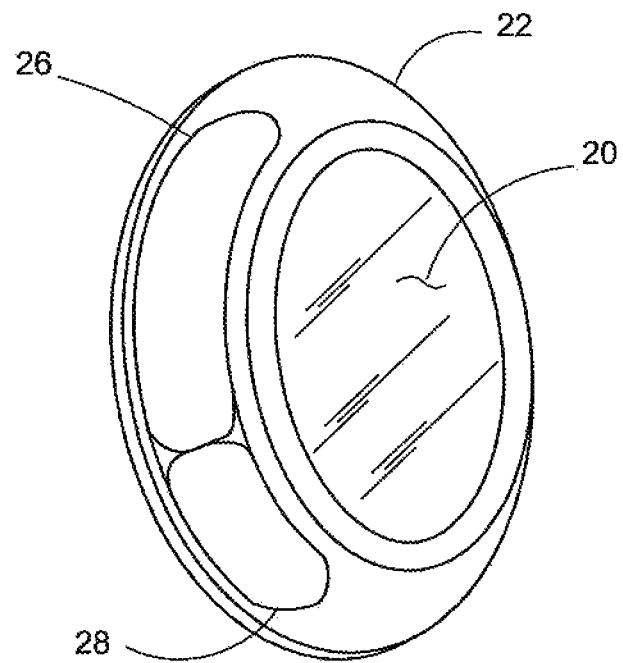
FIG. 5 diagrammatically illustrates one embodiment of the proximity sensor system.

FIG. 5 shows that the outboard surface 20 of body 22 is a mirror surface and the system includes a light generating display 26 and a proximity sensor or detector 28.

Figure 6:
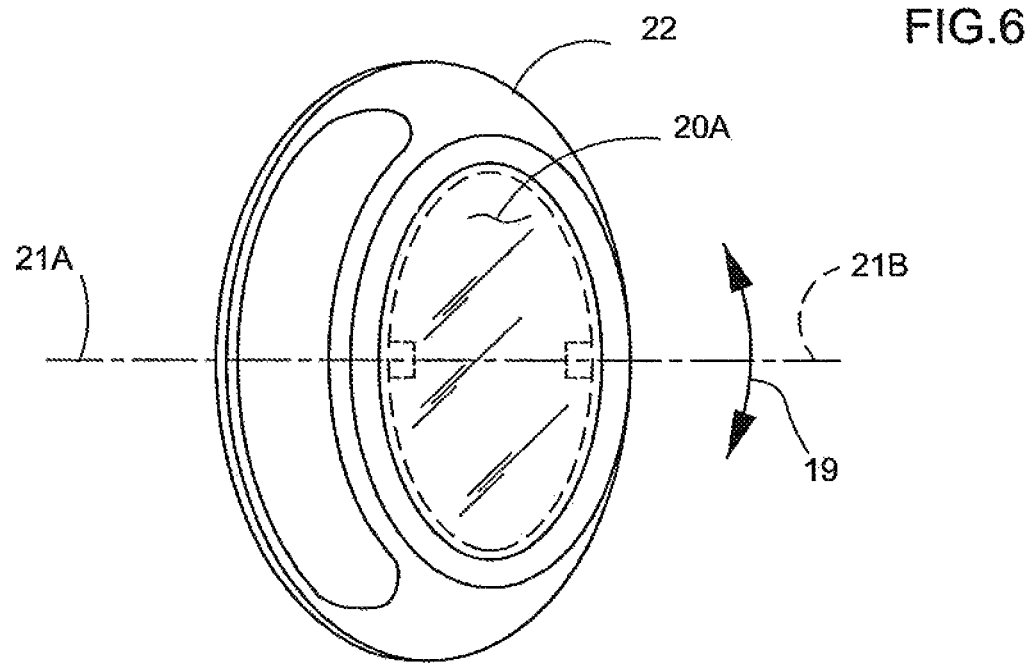
FIG. 6 diagrammatically illustrates a rotating mirror surface on the proximity sensor and display.

FIG. 6 shows that the proximity sensor and warning unit 22 includes a generally planar mirror 20A which slightly rotates about axis 21A-21B as shown by double headed arrow 19. In this manner, the driver can adjust the angular position of mirror 20A. In order to operate, mirror unit 20A must be slightly above surface 20 of proximity sensor and warning display unit 22. The underlying surface 20 of sensor and display unit 22 need not be mirrored. Optionally, a clip in rotatable mirror 20A could be provided to the driver such that the driver can install the rotatable mirror 20A into sensor and display unit 22. The pin for the snap-in or clip-in mirror 20A is the axle at 21A-21B, snapped into complementary channels at either side of the Movable mirror 20A.

Figures 7A, 7B, 7C:
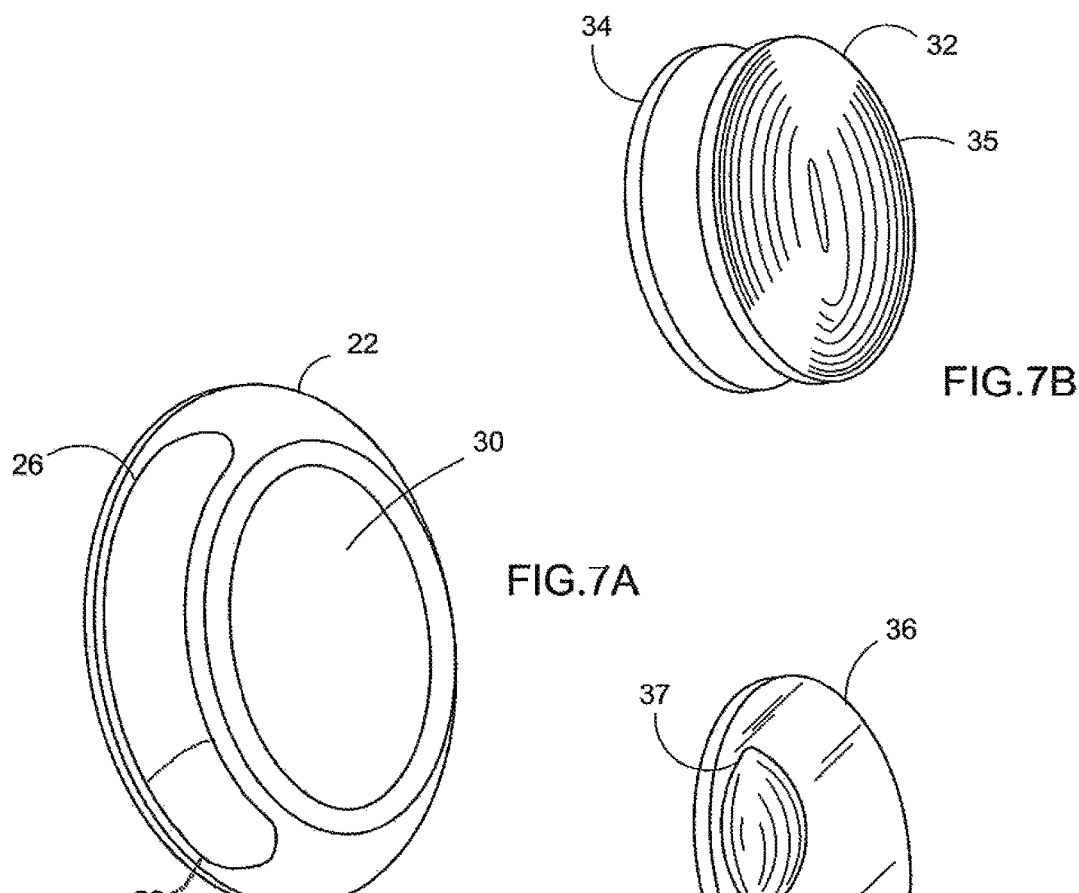
FIG. 7A diagrammatically illustrates the proximity sensor and display with a flat surface.
FIGS. 7B and 7C diagrammatically illustrate removable mirror systems that can be attached via and adhesive layer shown in FIG. 7B, to be adhered to surface 30 of the proximity sensor and display.
Figure 8:
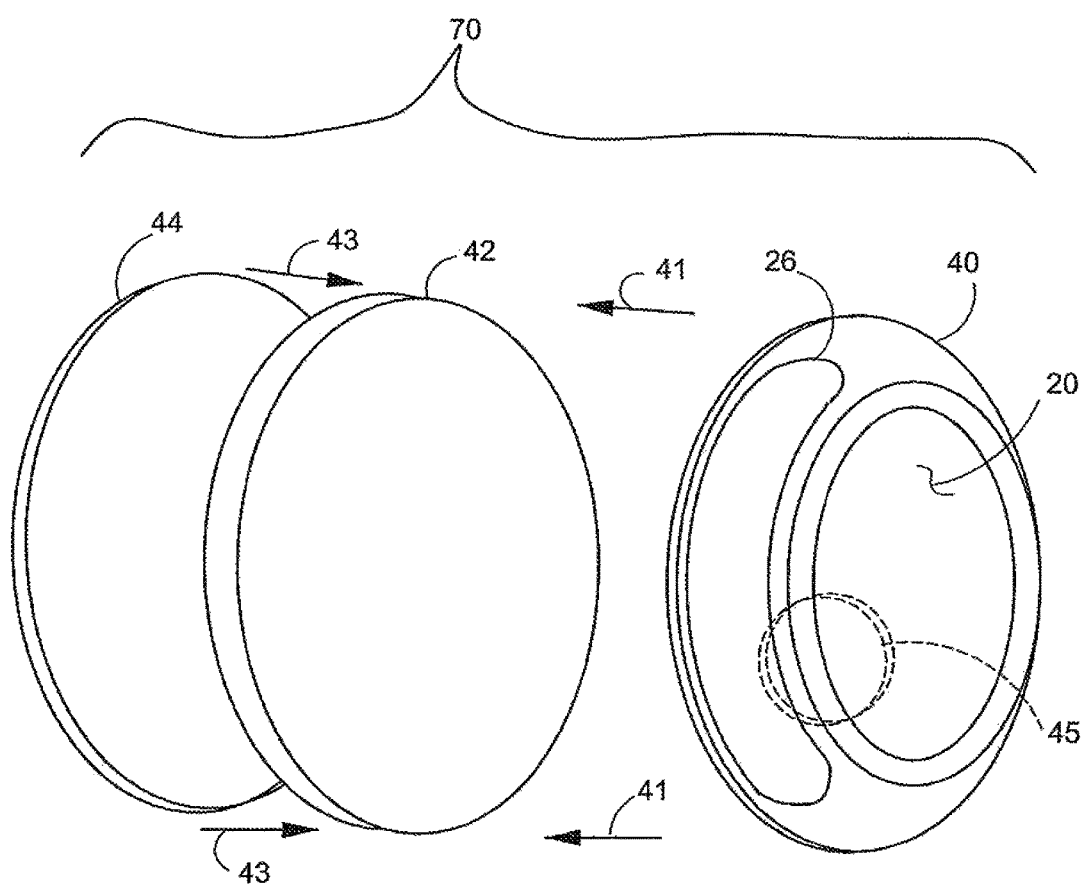
FIG. 8 diagrammatically illustrates the two-piece proximity sensor and display as well as the adhesive layer.

FIG. 7A diagrammatically shows sensor and warning unit 22 having a substantially outboard flat surface of 30. FIGS. 7B and 7C diagrammatically show replaceable and removable mirrors 32, 36. FIG. 7B shows an adhesive layer 34 that can be provided to attach mirrors 32, 36 to surface 30 in FIG. 7A. FIG. 7B shows that mirror 32 can be completely convex or completely concave. FIG. 7C shows that only part of the mirror forms a concave or a convex mirrored surface 37. The remaining surface of mirror 36 is a flat reflective mirror FIG. 8 diagrammatically shows a two-piece sensor and display unit wherein base 42 is removably coupled or connected to body 40. This is shown by arrows 41 in FIG. 8. An adhesive panel or layer 44 is placed on the rear side of the base 42 as shown by arrows 43. The adhesive permits the sensor and display to be mounted onto the mirror section of the outside rear view mirror of a vehicle. Body 40 is shown as having a battery 45 therein. The user can replace the battery by removing body 40 from base 42. Outer surface 20 of the body may include a flat face mirror or be utilized to mount the rotatable mirror or the removable and replaceable mirror systems shown in FIGS. 7B and 7C. The sensor and display section 26 is also shown in FIG. 8.

Figure 9:
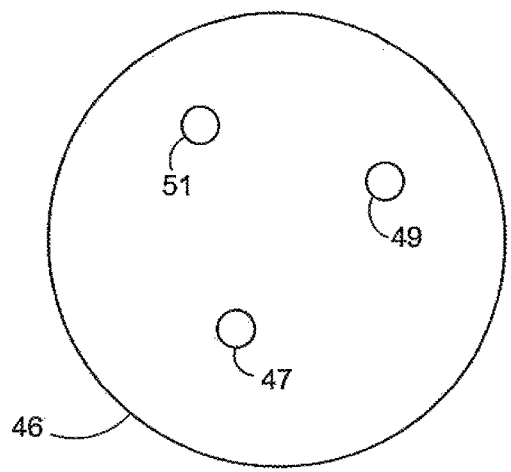
FIG. 9 diagrammatically illustrates magnetic coupler system for the two-piece sensor and display.

One system to removably attached or couple body 40 to base 42 utilizes a set of magnets shown in FIG. 9 as magnets 47, 49 and 51. FIG. 9 shows base 46. Complementary magnets would be found on the inboard surface of body 40.

Figure 10A:
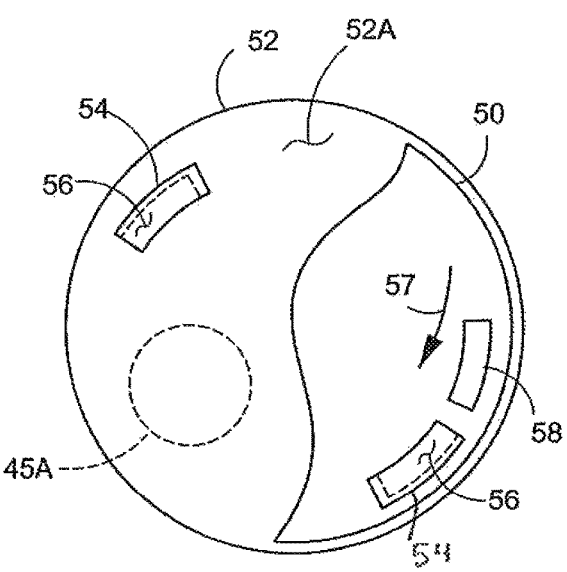
FIG. 10A diagrammatically illustrates a flat pin head or tab and a coacting channel coupling or attachment system for the two-piece sensor and display.

FIG. 10A shows both a tongue and groove removable attachment system or a flat pinhead or nail and a complementary channel attachment or coupler system. FIG. 10A diagrammatically shows, on the right-hand side, the front surface of base 42 which has a channel 56 formed by structure 54 which forms an open channel or groove 56 between the channel structure 54 and the surface 52A of base 52. A tongue 58 is shown on the broken away, right hand side of FIG. 10A. Arrow 57 shows that the tongue or flathead pin 58 can be inserted by rotating body 50 and inserting the pinhead or the tongue 58 into channel 56 of channel structure 54.

Figure 10B:
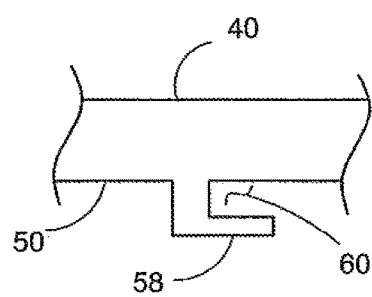
FIG. 10B diagrammatically illustrates the tab which is used to slide into the groove or channel to provide the complementary attachment or coupler.

FIG. 10B shows a bottom surface 50 of body 40 and a tongue 58 forming a hook with a hook opening 60 with co-acts with channel member 54 forming channel or groove 56.

Various attachment systems or coupling members and systems may be utilized. For example, a hook and loop cloth attachment may be used. The system may snap together. A tongue and groove attachment or complementary coupling system is available. Further, threaded attachments with either a nut and bolt or a screw and threaded passage coacting with threads formed in the base may be utilized. Threaded systems can be used to detach the body from the base in order to provide access to the battery or batteries.

FIG. 11 diagrammatically shows proximity sensor and warning unit 70 mounted on rearview mirror 10 and further shows removable body 72 having sensor system 76 and display system 74. The display system 47 is generally a semi-circle or a quarter radial segment on display 47. The radial segment is on the upper edge of either base 80 or body 92. See FIG. 12.

Figure 12:
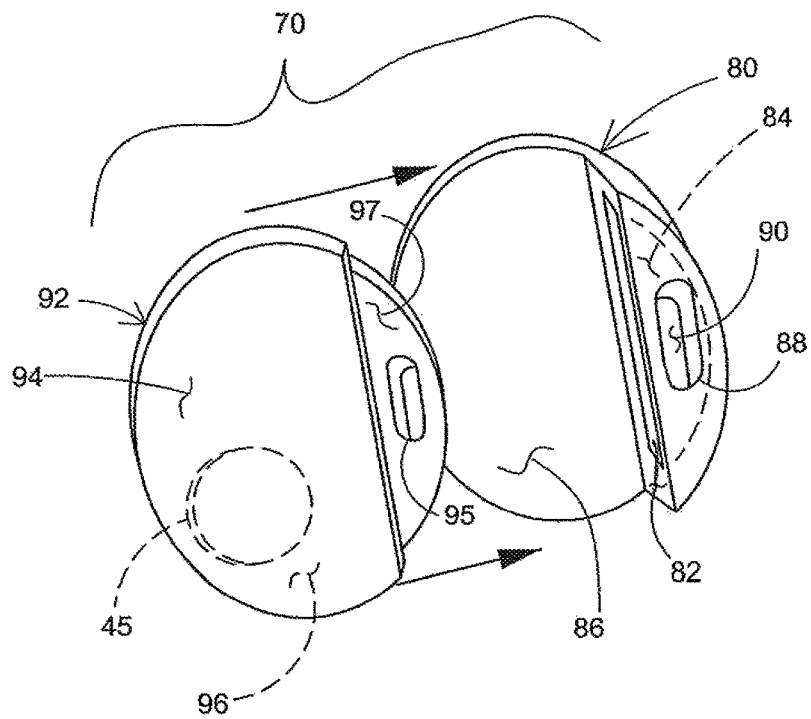
FIG. 12 diagrammatically illustrates the base of the sensor and display with a shelf and the body of the sensor and display with the insertable section as well as the depressible tab.

FIG. 12 shows more details of the sensor and warning unit 70. Removable body 92 has a substantially flat surface 94 and an insertion section 97. A depressible tab or button 95 extends above insertion section 97, that is, above the surface 94m 97 of the insertion section. Battery 45 is shown as being disposed and body 92. Base 80 has a generally flat outboard surface 86. Surface 86 can be generally identified as the front face of base 80. The rear face 96 of removable body 92 is also generally flat such that surfaces 96, 86, snugly fit together. Insertion section 97 is designed to slide into sleeve opening 84 of body 80. Sleeve opening 84 is formed by a shelf 82 that rises above surface 86 of base 80. Shelf 82 has a shelf opening or orifice 88 in its top platform defining opening 90.

Figure 13:
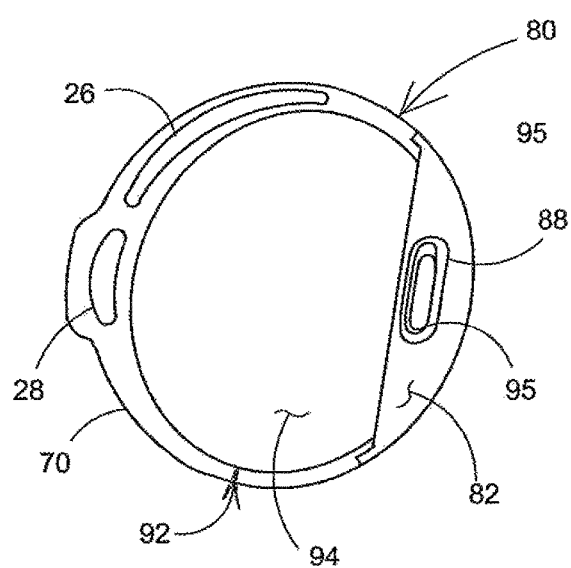
FIG. 13 diagrammatically illustrates the body coupled to the base with the insertion section beneath the shelf in the sleeve opening.

FIG. 13 shows that body 92 has been inserted and mounted atop base 80 such that depressible tab has popped up within the shelf opening 88. In this manner, the body is locked into the base. As discussed earlier in connection with FIGS. 7A, 7B and 7C, body surface 94 can be a flat face mirror or can have structures and features such that the user can replace the mirror and add different mirrors. Display system 26 in FIG. 13 is used to alert the driver when sensor unit 28 senses the oncoming approach of a vehicle as discussed above in connection with FIGS. 2 and 3.

Figure 14:
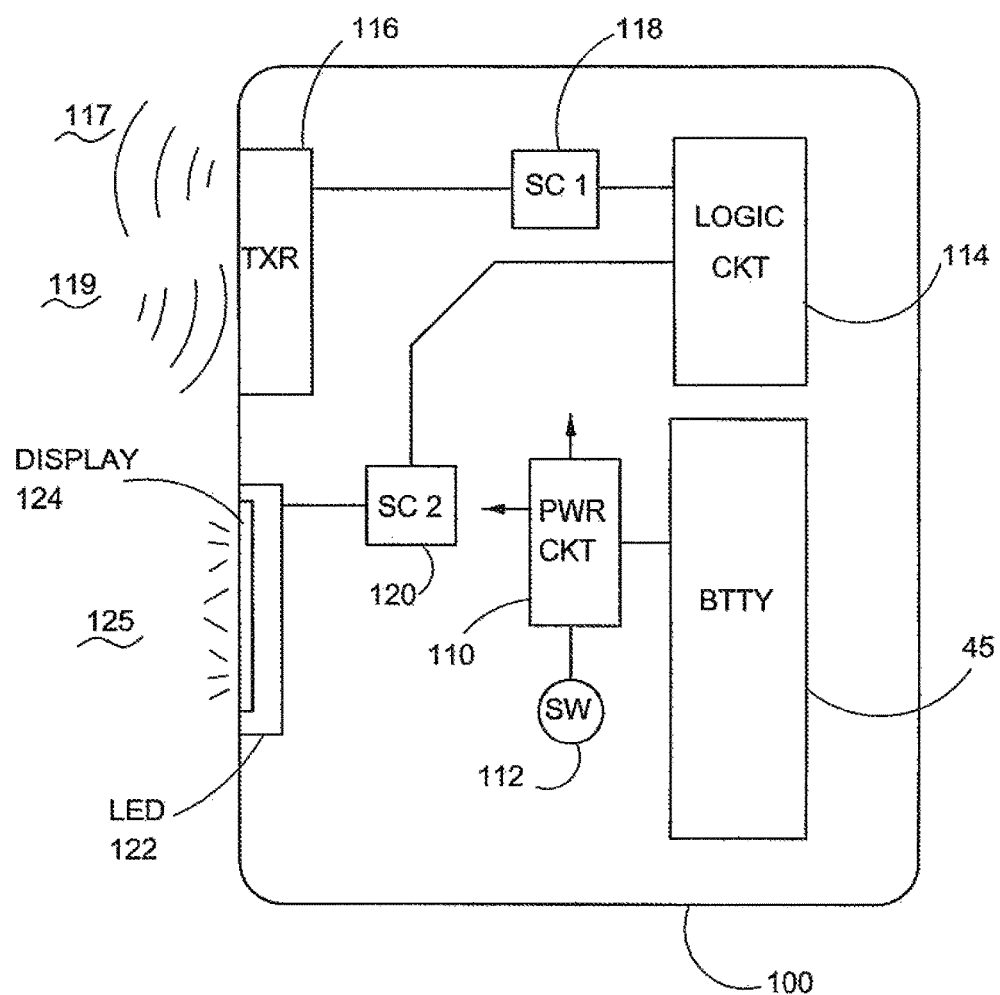
FIG. 14 diagrammatically illustrates the electrical component or diagram for one embodiment of the invention.

FIG. 14 diagrammatically illustrates the electronic components of one embodiment of the present invention. The component system 100 includes a battery 45 coupled to a power circuit 110. The power circuit conditions and alters the battery voltage and current and supplies power to the various electrical components in electrical system 100. A transmitter—receiver system 116 generates a detection signal 117 and receives the bounce back or reflected signal 119. These TXR units 116 are known to persons of ordinary skill. Logic circuit 114 not only controls transmitter—receiver 116 but also receives signals from transmitter—receiver circuit 116. A signal conditioning circuit SC1, designated as SC unit 118 conditions the signals to and from and between transmitter—receiver 116 and logic circuit 114. Upon the presence of an alarm signal generated based upon the reflected signal 119 and the transmitter receiver 116 and the logic circuit 114, logic circuit 114 issues a command to illuminate display 124. Signal conditioning circuit SC2 designated as SC unit 120 conditions the signals to and from display 124. The illuminated display may show a car or made indicate by blinking or other colored or bright light signal 125 to the driver. Display 124 in one embodiment is light-emitting diode or LED 122. To turn ON and OFF the system, as an option, the sensor and display system may include a switch 112. In one embodiment, switch 112 is a manual switch which may be associated with the depressible tab 95 discussed above.

Figure 15:
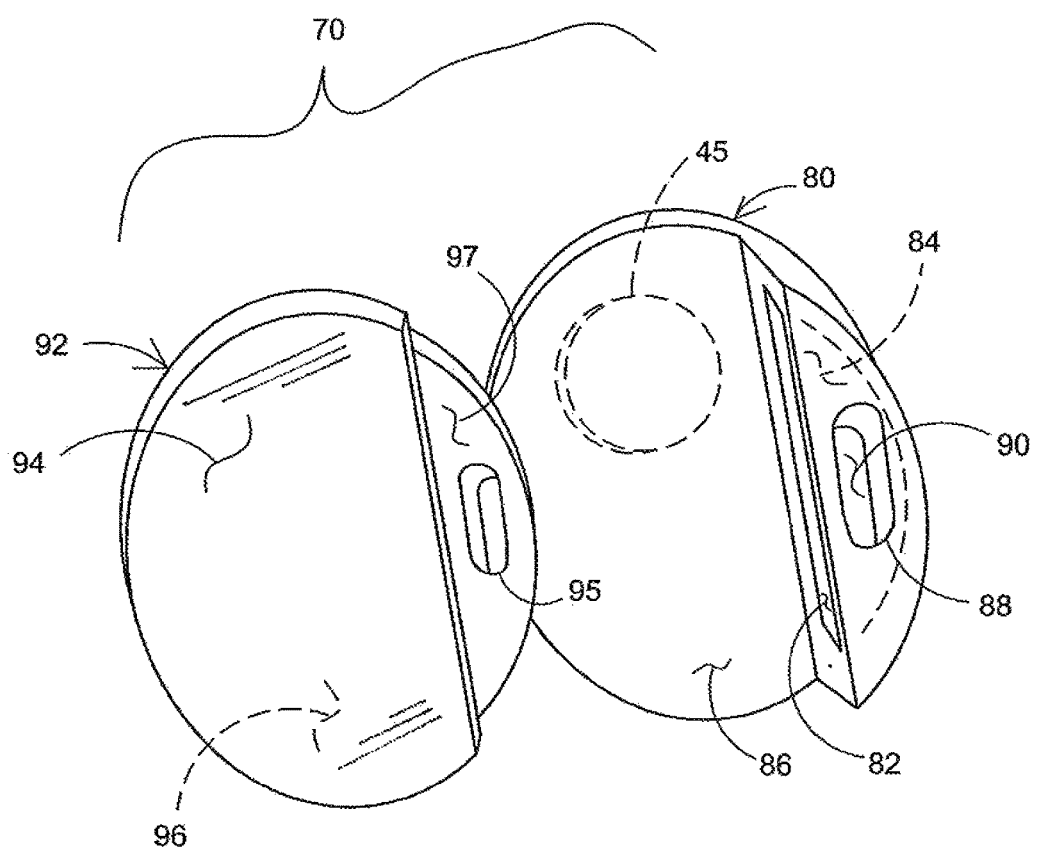
FIG. 15 diagrammatically illustrates a mirrored surface on the body and the battery located in the base of the sensor and display system.

FIG. 15 diagrammatically shows that battery 45 may be placed in base unit 80. Further, the generally flat face 94 of body 92 may have a flat faced mirror surface. Optionally, body 92 may include the convex or concave mirror sections as shown in connection with FIG. 7C. Further, rather than a flat face mirror 94 shown in FIG. 15, the body may carry a concave or convex mirrors shown in FIG. 7B.

Figure 16:
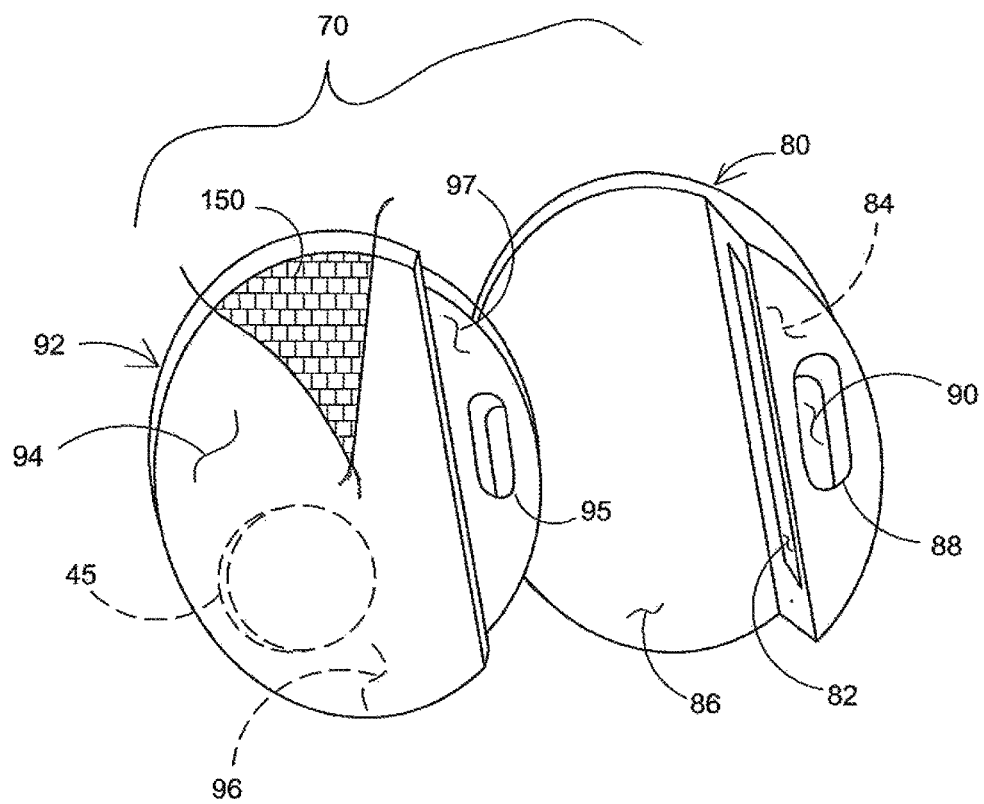
FIG. 16 diagrammatically illustrates solar cells as partially covering the body outerboard surface and the battery being placed in the body. It should be noted that the solar cells may cover part or all of the outboard surface of the body beyond the insertion section.

FIG. 16 diagrammatically shows that outboard surface 94 of body 92 may be covered in whole or in part by solar cells 150. FIG. 16 also shows that the battery 45 may be placed in the body 92 rather than in the base 80.

Figure 17:
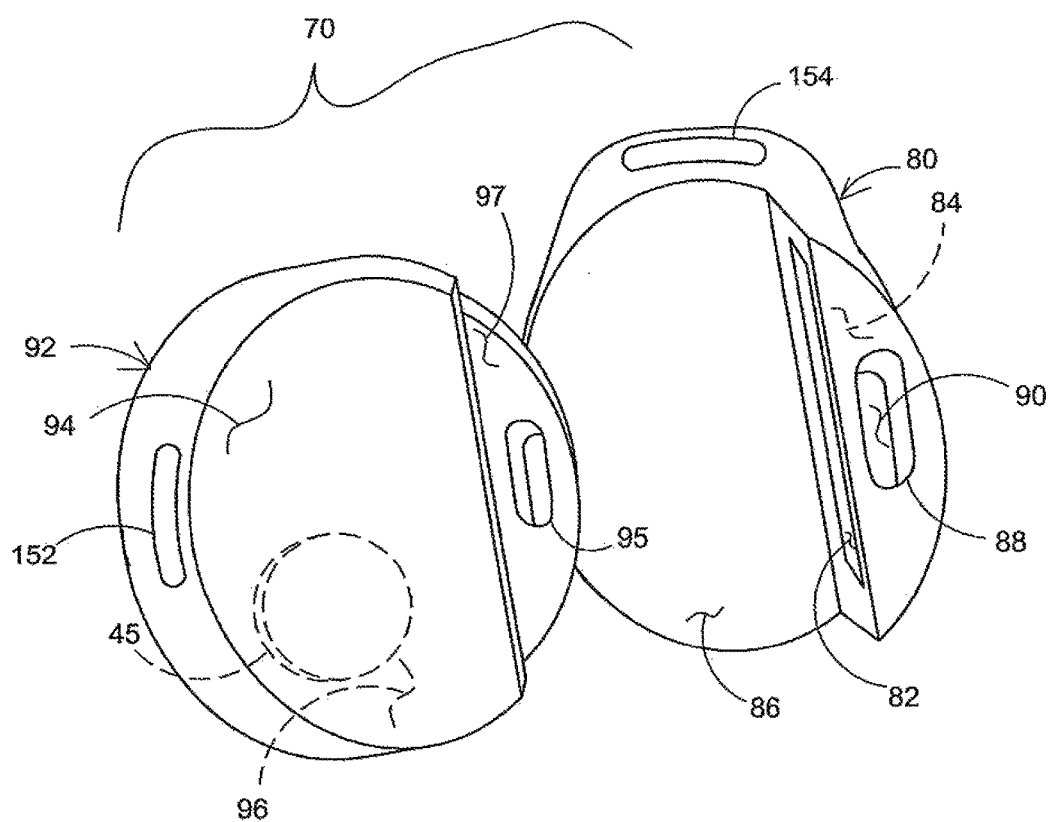
FIG. 17 diagrammatically illustrates the display system in the base and the sensor system in the removable body.

FIG. 17 diagrammatically shows that removable body 92 may include the sensor panel 152 which is part of the transmitter—receiver 116. Further, base 80 may include the lighted display 154.

Figure 18:
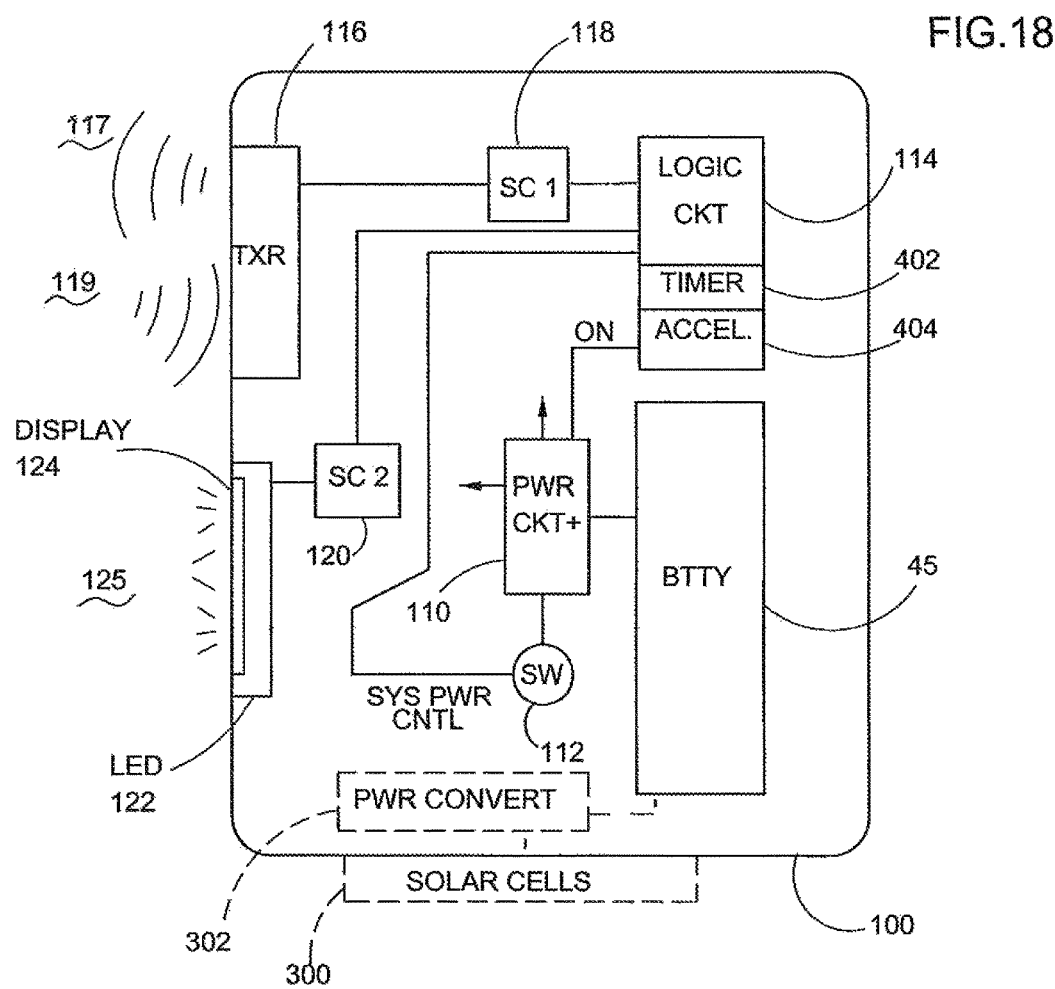
FIG. 18 diagrammatically illustrates the electrical component system for the automatic OFF sensor and display as well as optionally illustrating the solar power cell and power converter for the system.

FIG. 18 diagrammatically illustrates the automatic OFF as well as the optional solar cell rechargeable battery system. Abbreviations identified in FIG. 18 follow. Accel is an accelerometer; Ckt is a circuit; SC is a signal conditioner; pwr refers to a power unit; sys pwr cntl is a system power control signal applied to system ON-OFF switch 112; sw is a switch; btty is a battery; and txr is a transmitter-receiver; and pwr convert is a power converter which converts the energy from the solar cells 300 into a voltage and current to charge battery 45. The illustration of the battery 45 refers to one or more batteries. Optionally, electrical circuit 100 can include solar cells 300. The energy from solar cells 300 is converted by power converter 302 and the resulting power or energy is applied to battery 45.

With respect to the automatic OFF system, circuit 100 includes accelerometer 404 and a timer 402 which components are generally included with or on the logic circuit chip 114. The accelerometer 404 is always supplied with power ON. Master system switch 112 has a control input such that when the control signal, called the "system power control signal," is applied at the switch control input, switch 112 turns ON the power circuit 110 and activates not only the logic circuit 114 but also transmitter—receiver 116. In the presence of an oncoming vehicle and a proximity alert from unit 116, lighted display 124 via LED unit 122 is activated by the logic circuit. In this manner, the energy from battery 45 is presented to the primary sensory electronics only when the vehicle is in motion. Accelerometer 404 generates a motion signal only when the vehicle is in motion.

Figure 19:
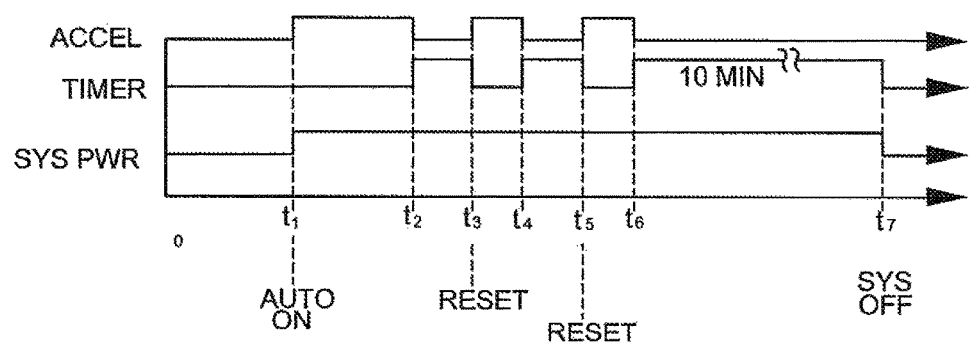
FIG. 19 diagrammatically illustrates the timing diagram for the auto OFF system shown in FIG. 18.

Timing diagram in FIG. 19 is discussed in connection with the automatic OFF electronic system shown in FIG. 18 (the solar recharge sub-system being optional). At the time T0, the system is stable, the vehicle is not moving and the system is generally powered is OFF. The accelerometer 404 is always ON but draws little battery power. A limited portion of the logic circuit is also always powered ON to be activated fully ON when the acceleration sensor circuit 404 goes ON. When the vehicle begins to move at time T1, the system automatically goes ON as shown by the system power timeline in FIG. 19. Logic circuit 114 reacts and turns ON the power switch in response to this motion signal from accelerometer 404. At time T2, the vehicle stops and the signal from accelerometer 404 changes state. In the illustrated embodiment, the signal goes low. Also at that time, the timer 402 is activated ON and the timer count is started. Timer 402 stays ON and counts until logic circuit 114 detects the presence of a motion signal from accelerometer at time T3. This new motion signal resets the timer 402 and the timer signal goes low or OFF. At time T4, the accelerometer turns OFF the motion signal and the timer is activated ON again. At time T5, the accelerometer indicates a motion, and the timer is reset and goes low—OFF. At time T6, the accelerator determines that the vehicle is no longer moving and the timer signal goes high—ON and is activated into a counting state. After a predetermined period of time, such as 10 minutes, the timer reaches the count threshold (the timer counts up or counts down to the programmed threshold) and at the end of the count, the timer changes state (goes low or OFF) and this causes generation of a system power OFF signal applied as a system power control signal from logic circuit 114 to be applied to master system switch 112. In this manner, the energy in battery 45 is saved because the transmitter—receiver is turned OFF as are other major components. The timer's predetermined period of time can be changed based by the designer of the system.

The claims appended hereto are meant to cover modifications and changes within the scope and spirit of the present invention.

What is claimed is:

1. An automobile or vehicle proximity sensor and warning display adapted to be mounted on an outside rear view mirror of a vehicle comprising:
a substantially flat plate planar base having an adhesive layer on a rear side of said base whereby said base is adapted to be attached to said outside rear view mirror;
a body removably mounted on a front side of said base;
a battery disposed in a cavity in either said base or said body, said battery adapted to be removed from said cavity by removing said body from said base;
an automobile proximity detector disposed in said body and powered by said battery, said proximity detector adapted to respond to an approaching vehicle and generate an alarm signal; and
a light generating display powered by said battery, coupled to said proximity detector, which is illuminated in the presence of said alarm signal;
including a means for removable attachment between said body and said base.

2. A proximity sensor as claimed in claim 1 wherein said body has an outboard facing mirrored surface.

3. A proximity sensor as claimed in claim 1 including a rotating platform on said outboard facing surface, said platform having said mirrored surface is which adapted to rotate.

4. A proximity sensor as claimed in claim 1 wherein said means for removable attachment is an attachment from the group of attachments including a hook and loop attachment; a magnetic attachment; a snap attachment; a tongue and groove attachment; a flat head pin and channel attachment; and a threaded attachment.

5. A proximity sensor as claimed in claim 1 wherein said body has a substantially flat outboard facing surface upon which is mounted a removable mirror, said removable mirror is a mirror from the group of mirrors including a mirror having a substantially flat mirrored surface; a mirror having a fully convex mirrored surface; a mirror having a fully concave mirrored surface; a mirror having a convex mirrored surface formed atop a flat mirrored surface; and a mirror having a convex mirrored surface formed atop a flat mirrored surface.

6. A proximity sensor as claimed in claim 1 wherein said display is located in either said base or said body.

7. A proximity sensor as claimed in claim 1 including a solar panel on an outboard surface of either said body or said base coupled to said battery and adapted to recharge said battery.

8. A proximity sensor as claimed in claim 1 including an accelerometer powered by said battery generating a motion signal, a timer coupled to said accelerometer which generates a time-out signal after a predetermined period of time, and a system power switch coupled to and interposed between said battery and said proximity detector, said system power switch coupled to said timer and turned OFF in the presence of said time-out signal.

9. A proximity sensor as claimed in claim 1 wherein:
a shelf rising above a portion of said substantially flat plate planar base and forming sleeve opening between said substantially flat plate planar base and said shelf;
said shelf having an orifice thereon;
said body having an insertion section adapted to be inserted into said sleeve opening; and
said insertion section having a depressible tab sized to fit within and extend through said shelf orifice;
whereby said body is removably mounted onto said base by insertion of said insertion section into said sleeve opening and is locking onto said base by coaction of said depressible tab in said shelf orifice and is removable by depression of the tab and withdrawal of the insertion section from the sleeve opening.

10. A proximity sensor as claimed in claim 9 wherein said body has a substantially flat outboard facing surface beyond said insertion section and said body has one of (a) an outboard facing mirrored surface beyond said insertion section; (b) a rotating platform on said outboard facing surface, said platform having said mirrored surface is which adapted to rotate; CD a removably mounted mirror, wherein said removable mirror is one mirror from the group of mirrors including a mirror having a substantially flat mirrored surface, a mirror having a fully convex mirrored surface; a mirror having a fully concave mirrored surface; a mirror having a convex mirrored surface formed atop a flat mirrored surface; and a mirror having a convex mirrored surface formed atop a flat mirrored surface.

11. A proximity sensor as claimed in claim 10 wherein said display is located in either said base or said body and including an accelerometer powered by said battery generating a motion signal, a timer coupled to said accelerometer which generates a time-out signal after a predetermined period of time, and a system power switch coupled to and interposed between said battery and said proximity detector, said system power switch coupled to said timer and turned OFF in the presence of said time-out signal.

12. An automobile or vehicle proximity sensor and warning display adapted to be mounted on an outside rear view mirror of a vehicle comprising:
a substantially flat plate planar base having an adhesive layer on a rear side of said base whereby said base is adapted to be attached to said outside rear view mirror;
a body removably mounted on a front side of said base;
a battery disposed in a cavity in either said base or said body, said battery adapted to be removed from said cavity by removing said body from said base;
an automobile proximity detector disposed in said base and powered by said battery, said proximity detector adapted to respond to an approaching vehicle and generate an alarm signal; and
a light generating display powered by said battery, coupled to said proximity detector, which is illuminated in the presence of said alarm signal;
a shelf rising above a portion of said substantially flat plate planar base and forming sleeve opening between said substantially flat plate planar base and said shelf;
said shelf having an orifice thereon;
said body having an insertion section adapted to be inserted into said sleeve opening; and
said insertion section having a depressible tab sized to fit within and extend through said shelf orifice;
whereby said body is removably mounted onto said base by insertion of said insertion section into said sleeve opening and is locking onto said base by coaction of said depressible tab in said shelf orifice and is removable by depression of the tab and withdrawal of the insertion section from the sleeve opening.

13. A proximity sensor as claimed in claim 12 wherein said body has a substantially flat outboard facing surface beyond said insertion section and said body has one of (a) an outboard facing mirrored surface beyond said insertion section; (b) a rotating platform on said outboard facing surface, said platform having said mirrored surface is which adapted to rotate; (c) a removably mounted mirror, wherein said removable mirror is one mirror from the group of mirrors including a mirror having a substantially flat mirrored surface, a mirror having a fully convex mirrored surface; a mirror having a fully concave mirrored surface; a mirror having a convex mirrored surface formed atop a flat mirrored surface; and a mirror having a concave mirrored surface formed atop a flat mirrored surface.

14. A proximity sensor as claimed in claim 13 wherein said display is located in either said base or said body and including an accelerometer powered by said battery generating a motion signal, a timer coupled to said accelerometer which generates a time-out signal after a predetermined period of time, and a system power switch coupled to and interposed between said battery and said proximity detector, said system power switch coupled to said timer and turned OFF in the presence of said time-out signal.

15. A proximity sensor as claimed in claim 12 wherein said display is located in either said base or said body and including an accelerometer powered by said battery generating a motion signal, a timer coupled to said accelerometer which generates a time-out signal after a predetermined period of time, and a system power switch coupled to and interposed between said battery and said proximity detector, said system power switch coupled to said timer and turned OFF in the presence of said time-out signal.

16. A proximity sensor as claimed in claim 14 including a coupler permitting attachment and detachment between said body and said base, said coupler being one from the group of couplers including hook and loop complementary couplers; a magnetic complementary couplers; a snap system; tongue and groove complementary couplers; a flat head pin coacting with a channel coupler; and threaded complementary couplers.

17. A proximity sensor as claimed in claim 16 including a solar panel on an outboard surface of either said body or said base coupled to said battery and adapted to recharge said battery.

18. A proximity sensor as claimed in claim 17 including a manual ON-OFF switch coupled to the battery power, said switch activated by said depressible tab.

19. A proximity sensor as claimed in claim 12 including an accelerometer powered by said battery generating a motion signal, a timer coupled to said accelerometer which generates a time-out signal after a predetermined period of time, and a system power switch coupled to and interposed between said battery and said proximity detector, said system power switch coupled to said timer and turned OFF in the presence of said time-out signal.

20. An automobile or vehicle proximity sensor and warning display adapted to be mounted on an outside rear view mirror of a vehicle comprising:
   a substantially flat plate planar base having an adhesive layer on a rear side of said base whereby said base is adapted to be attached to said outside rear view mirror;
   a body removably mounted on a front side of said base;
   a battery disposed in a cavity in either said base or said body, said battery adapted to be removed from said cavity by removing said body from said base;
   an automobile proximity detector disposed in said body and powered by said battery, said proximity detector adapted to respond to an approaching vehicle and generate an alarm signal; and
   a light generating display powered by said battery, coupled to said proximity detector, which is illuminated in the presence of said alarm signal;
   including a rotating platform on said outboard facing surface, said platform having said mirrored surface is which adapted to rotate.

21. An automobile or vehicle proximity sensor and warning display adapted to be mounted on an outside rear view mirror of a vehicle comprising:
   a substantially flat plate planar base having an adhesive layer on a rear side of said base whereby said base is adapted to be attached to said outside rear view mirror;
   a body removably mounted on a front side of said base;
   a battery disposed in a cavity in either said base or said body, said battery adapted to be removed from said cavity by removing said body from said base;
   an automobile proximity detector disposed in said body and powered by said battery, said proximity detector adapted to respond to an approaching vehicle and generate an alarm signal; and
   a light generating display powered by said battery, coupled to said proximity detector, which is illuminated in the presence of said alarm signal;
   including an accelerometer powered by said battery generating a motion signal, a timer coupled to said accelerometer which generates a time-out signal after a predetermined period of time, and a system power switch coupled to and interposed between said battery and said proximity detector, said system power switch coupled to said timer and turned OFF in the presence of said time-out signal.

22. An automobile or vehicle proximity sensor and warning display adapted to be mounted on an outside rear view mirror of a vehicle comprising:
   a substantially flat plate planar base having an adhesive layer on a rear side of said base whereby said base is adapted to be attached to said outside rear view mirror;
   a body removably mounted on a front side of said base;
   a battery disposed in a cavity in either said base or said body, said battery adapted to be removed from said cavity by removing said body from said base;
   an automobile proximity detector disposed in said body and powered by said battery, said proximity detector adapted to respond to an approaching vehicle and generate an alarm signal; and
   a light generating display powered by said battery, coupled to said proximity detector, which is illuminated in the presence of said alarm signal;
   a shelf rising above a portion of said substantially flat plate planar base and forming sleeve opening between said substantially flat plate planar base and said shelf;
   said shelf having an orifice thereon;
   said body having an insertion section adapted to be inserted into said sleeve opening; and
   said insertion section having a depressible tab sized to fit within and extend through said shelf orifice;
   whereby said body is removably mounted onto said base by insertion of said insertion section into said sleeve opening and is locking onto said base by coaction of said depressible tab in said shelf orifice and is removable by depression of the tab and withdrawal of the insertion section from the sleeve opening.

* * * * *